United States Patent [19]
Orain

[11] Patent Number: 5,160,108
[45] Date of Patent: Nov. 3, 1992

[54] PROCESS AND TOOL FOR PRODUCING A BARREL FOR A TELESCOPIC UNIVERSAL TRANSMISSION JOINT

[75] Inventor: Michel Orain, Conflans-Ste-Honorine, France

[73] Assignee: Glaenzer Spicer, Poissy, France

[21] Appl. No.: 810,437

[22] Filed: Dec. 19, 1991

Related U.S. Application Data

[63] Continuation of Ser. No. 602,971, Oct. 26, 1990, abandoned.

[30] Foreign Application Priority Data

Nov. 17, 1989 [FR] France ............... 89 15106

[51] Int. Cl.[5] ............................. B21K 21/16
[52] U.S. Cl. ......................... 72/370; 72/401; 72/402
[58] Field of Search .............. 72/353.6, 354.2, 370, 72/398, 401, 402

[56] References Cited

U.S. PATENT DOCUMENTS 4,381,659  5/1983  Welch et al. ............... 72/370
4,453,395  6/1984  Takeda et al. .............. 72/370

FOREIGN PATENT DOCUMENTS 0041302 12/1981 European Pat. Off. .
0058465  8/1982 European Pat. Off. .
0062067 10/1982 European Pat. Off. .
0074614  3/1983 European Pat. Off. .
2133292 11/1972 France .
2169450  9/1973 France .
2607883 10/1988 France .

Primary Examiner—Lowell A. Larson
Attorney, Agent, or Firm—Wenderoth, Lind & Ponack

[57] ABSTRACT

A barrel to be formed has internal tracks of circular profile which abut ridges (4). The process starts with a sheet-metal blank which is arranged around an inner shaping mandrel equipped with protuberances integral or rotatably attached and defining shaping surfaces for the tracks. Three dies are displaced radially and have a projection which initiates a fold and which then forces this fold between the protuberances in order to produce the ridge as a result of a flow of material towards this region, which will undergo a very high load during operation.

33 Claims, 8 Drawing Sheets

FIG_3

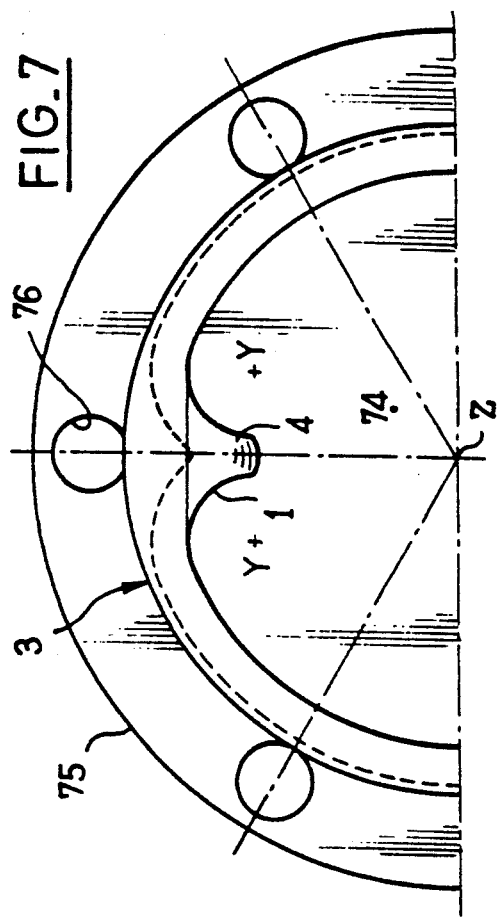
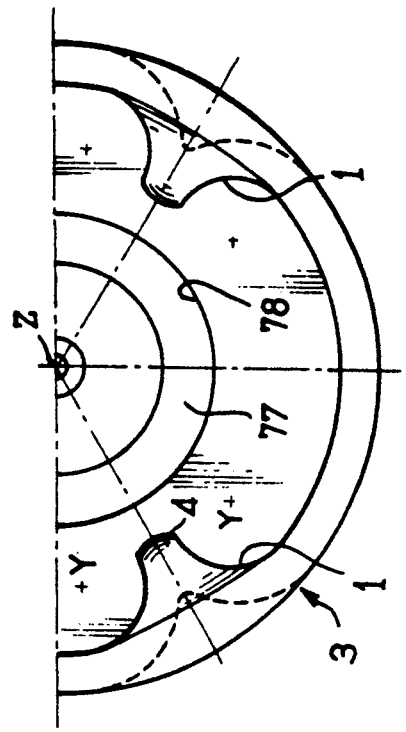
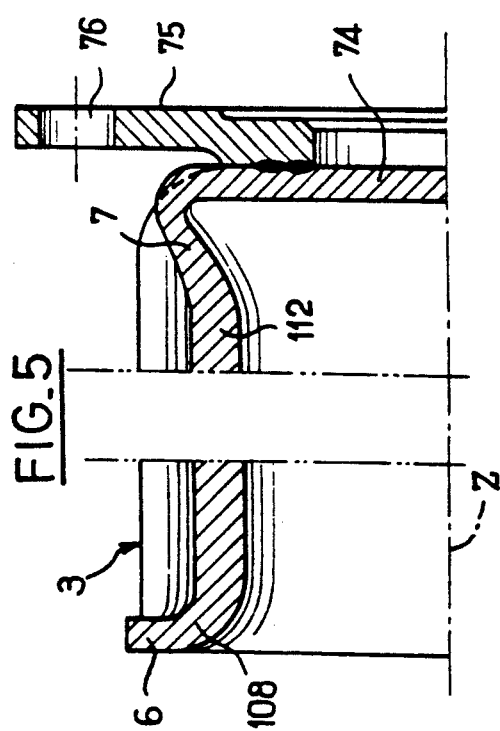
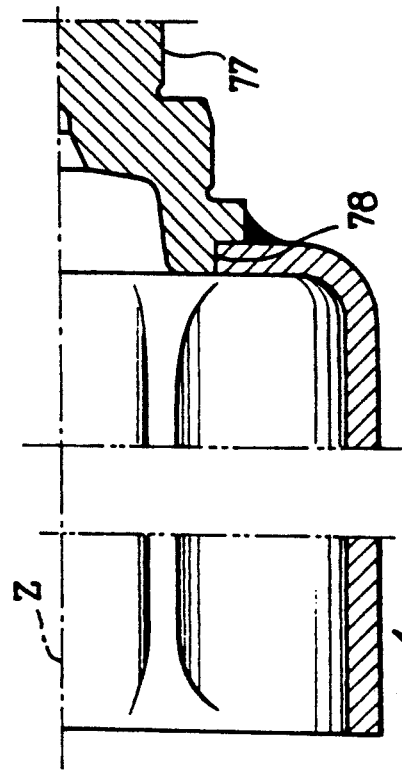

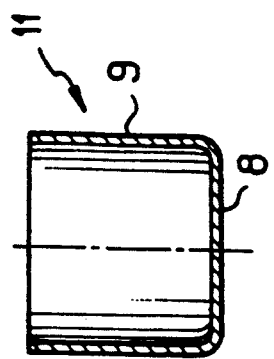
FIG._12
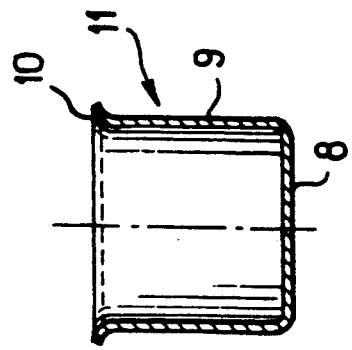
FIG._13
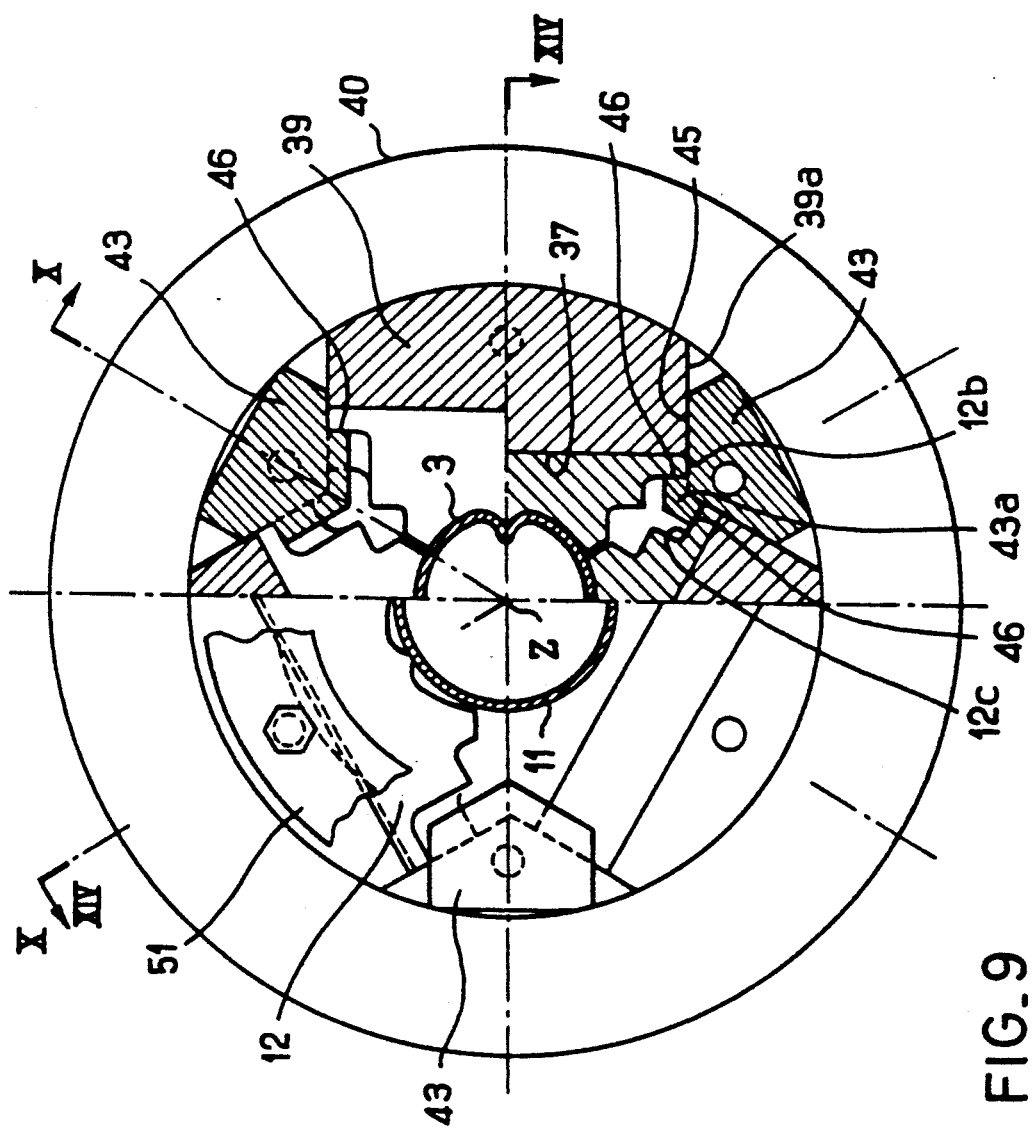
FIG._9

PROCESS AND TOOL FOR PRODUCING A BARREL FOR A TELESCOPIC UNIVERSAL TRANSMISSION JOINT

This application is a continuation of application Ser. No. 07/602,971, filed on Oct. 26, 1990, now abandoned.

BACKGROUND OF THE INVENTION (1) Field of the Invention

The present invention relates to a process for producing a barrel of a telescopic universal transmission joint, especially for motor vehicles.

The present invention also relates to a tool for producing such a barrel.

The present invention likewise relates to a telescopic universal transmission joint comprising such a barrel, especially for motor vehicles.

(2) State of the Prior Art

FR-A-2,607,883 makes known a homokinetic transmission joint comprising an internal member, also called a "tripod", equipped with three arms arranged substantially radially in relation to its axis and each partially surrounded by two roller segments. Radially outer faces of curved transverse profile of the roller segments are in longitudinal rolling and lateral oscillation contact with longitudinal tracks formed on the inner face of a barrel, which surrounds the internal member and which is connected to one of two shafts between which transmission is to be obtained.

The interposed members, each consisting, according to this document, of roller segments, transmit forces oriented tangentially between the arms of the internal member and the corresponding tracks of the barrel at a point on the tracks which is a function of the state of telescopic compression of the joint, of the angle between the axes of the internal member and the barrel, and of the position of the particular arm in relation to the plane in which these two axes are located. Instead of being roller segments, the interposed members can be blocks which slide along the tracks or composite members capable of rolling and sliding, as provided according to FR-A-2,622,653, or members of variable configuration, as described, for example, in FR-A-2,525,306. Conventionally, the internal member has three radial arms, which is why it is usually called a tripod, but this number is not mandatory, and internal members having, for example, two or four arms are possible.

The barrel is often closed on one side by a bottom, so as to form with this bottom what is called a "bowl" of a generally cylindrical shape.

The barrel is produced from a steel blank having a cylindrical outer surface and an inner surface in which the longitudinal tracks are machined. The barrel is generally the part of the joint involving the highest outlay because of its volume of material and the difficulty of machining the tracks with the accuracy and the surface state required on the inside of this part closed by the bottom.

Attempts have been made to carry out cold or semi-hot extrusion processes, but the surface quality, profile accuracy and correctness necessary for the tracks are insufficient to ensure that, in the production of large series, these joints have the expected high degree of comfort during operation under economically competitive conditions.

Moreover, each track has a length which is large in relation to its diameter, and therefore the grinding of the tracks involves too high an outlay.

SUMMARY OF THE INVENTION

The object of the present invention is to provide a process and a tool for producing a barrel under especially economical conditions and a transmission joint equipped with such a barrel. The production process and tool must allow the joints equipped with the barrels so obtained to benefit in full from their inherent high comfort performance.

According to a first aspect of the invention, the process for shaping a barrel for a sliding universal transmission joint, this barrel comprising an annular wall, an inner face of which defines tracks of substantially circular profile which extend parallel to an axis of the barrel, is characterized in that a substantially cylindrical lateral wall of a blank is placed between an inner shaping mandrel located radially within the lateral wall and having shaping surfaces substantially complementary with the tracks to be formed and dies located radially outside the lateral wall, succeeding one another circumferentially with a circumferential play between them and having pressure surfaces towards the lateral wall of the blank, and in that a simultaneous displacement towards the axis of the mandrel, is imparted to the dies so that their pressure surface compresses the lateral wall of the blank radially against the shaping surfaces of the mandrel.

All the tracks to be formed on the inner face of the annular wall of the barrel are thus produced very simply and in a single quick and accurate operation.

The blank used at the outset of this process can be a deep-drawn sheet-metal blank, the wall of which has a substantially constant thickness.

When, as so often happens, the barrel to be produced comprises concave tracks, each extending on one flank of a ridge separating it from an adjacent track extending on the other flank of this ridge, the pressure surfaces of the dies used have projections, by means of which the material of the blank is made to flow radially inwards into clearances, each defined between protuberances of the mandrel which carry the surfaces for shaping two adjacent tracks to be produced.

This flow of material generates a kind of reinforced bead in one of the regions of the barrel which undergoes an especially high stress when the transmission joint is in operation.

According to a second aspect of the invention, the press tool for forming a barrel for a sliding universal transmission joint is characterized in that it comprises a mandrel intended to be connected to a press piston for movement parallel to a central axis of the mandrel. This mandrel has on its periphery cylindrical shaping surfaces on an axis parallel to the central axis, the tool furthermore comprising dies succeeding one another circumferentially with, at least in a position of rest, a circumferential play between them. The dies are mounted on slideways having orientations converging towards the axis of the mandrel. A pusher is intended to be connected to the press piston in order to simultaneously to compel the dies to slide along the slideways in the direction converging towards the axis of the mandrel.

Because the dies are mounted on oblique slideways, the straight movement of a press can be converted into a simultaneous movement of the dies towards the axis of the mandrel, and this movement, although being oblique in relation to the slideways, can be strictly radial relative to the blank and to the mandrel, since the mandrel, being connected to the press piston, can have, together with the blank, a movement corresponding to the axial component of the movement of the dies.

According to a third aspect of the invention, the telescopic universal transmission joint, especially for vehicles, comprising an internal member equipped with arms arranged substantially radially in relation to its axis and each partially surrounded by two interposed elements, of which the radially outer faces of curved transverse profile bear on longitudinal tracks of substantially complementary profile belonging to the inner face of an annular wall of a barrel, in relation to which each arm of the internal member is movable over a predetermined telescopic stroke, is characterized in that the annular wall is produced from sheet metal and has an outer profile which approximately follows the inner profile of this wall.

According to a preferred embodiment, in which the tracks are concave and are distributed in pairs separated by ridges, the radial thickness of material of the annular wall is increased in line with the ridges.

Other particular features and advantages of the invention will also emerge from the following description.

BRIEF DESCRIPTION OF THE DRAWINGS

In the accompanying drawings:

FIG. 5 is an axial half-section through a barrel to which a flange has been welded;

FIG. 6 is an axial half-section through a barrel to which an axle stub has been welded;

FIG. 7 is a front half-view of the flanged barrel of FIG. 5;

FIG. 8 is a front half-view of the axle-stub barrel of FIG. 6;

FIG. 9 is a top view of the peripheral part of a press shaping tool, with partial sections of the right-hand part of FIG. 10 along the planes IX—IX and IX'—IX' at the top right, and at the bottom right respectively;

FIG. 12 is an axial section through a bowl blank;

FIG. 13 is an axial section through a rimmed bowl blank;

DETAILED DESCRIPTION OF THE PREFERRED EMBODIMENT

Figure 15:
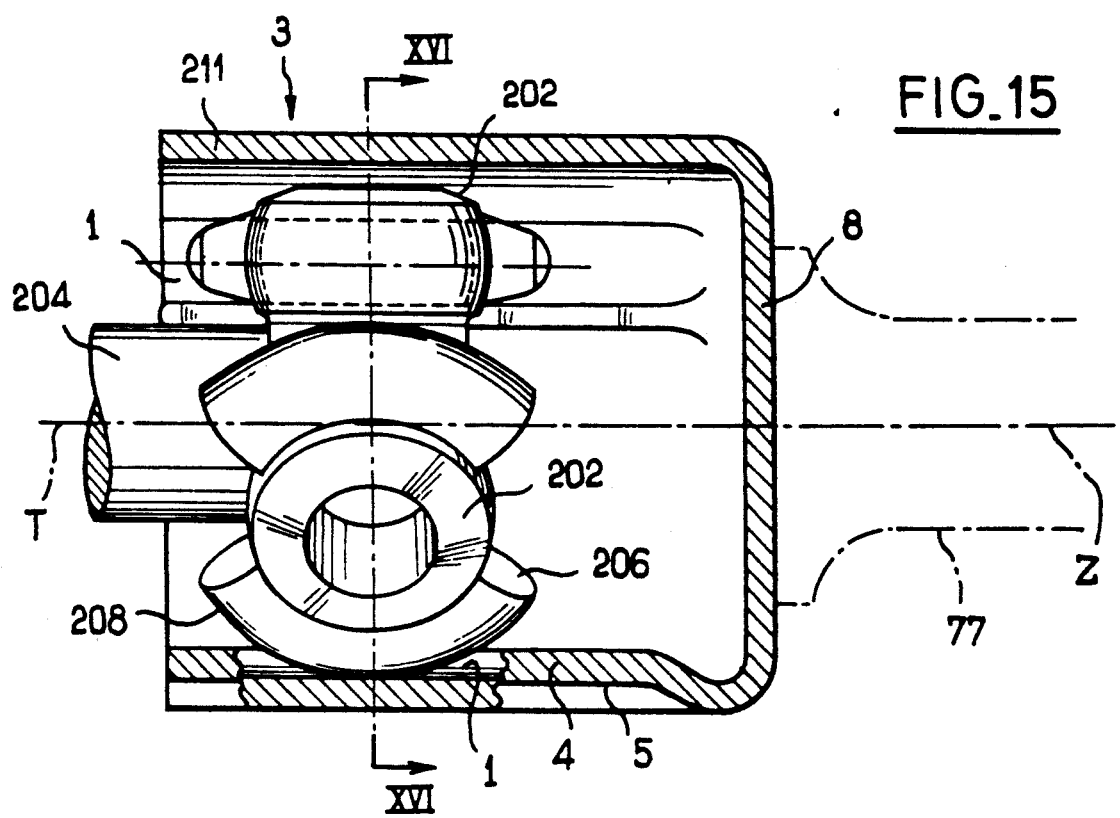
FIG. 15 is a side elevation view of a telescopic universal transmission joint according to the invention, with an axial section through the barrel along the plane XV—XV of FIG. 16 and a section through a cutaway along the plane XV'—XV' of FIG. 16.
Figure 16:
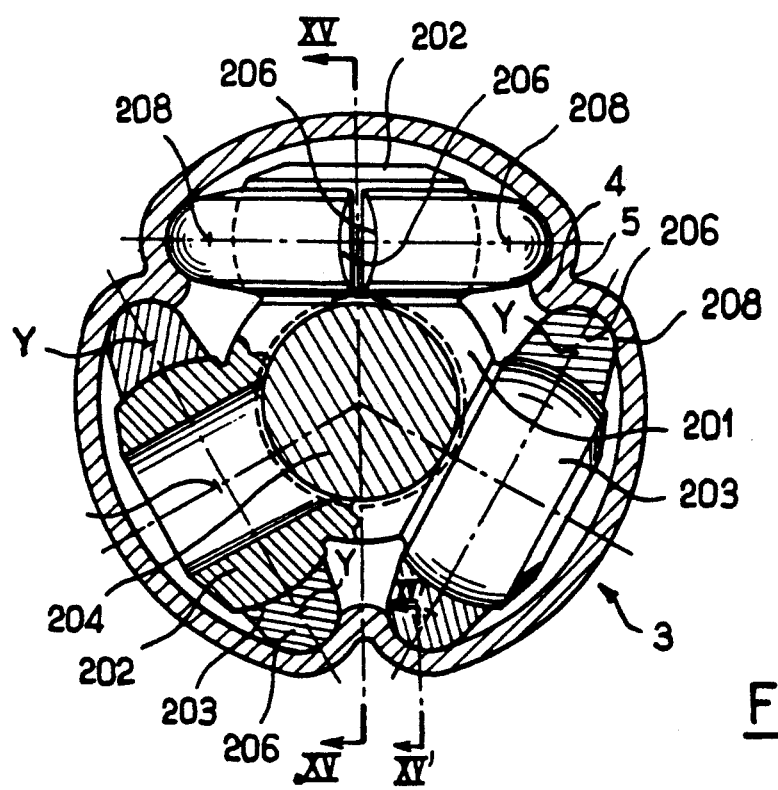
FIG. 16 is an end view of the joint of FIG. 15, with a partial section along the plane XVI—XVI of FIG. 15.

In the example illustrated in FIGS. 15 and 16, the homokinetic transmission joint comprises a first member or tripod comprising a ring 201 having an axis T, from which three radial arms 202, equally angularly spaced about the T axis, extend radially outwards. The lateral wall of each arm 202 consists of a convex spherical zone 203, the center S of which is located at a distance from the axis T. This tripod is fitted onto and fastened to a shaft 204, the rotational movement about the axis T of which is to be transmitted universally and telescopically to a rotary element 77 of axis Z which can be an axle stub for driving a vehicle drive wheel.

Each arm 202 of the tripod is partially surrounded by two roller segments 206, a radially inner concave spherical surface of which (relative to the axis of the arm) is in ball-and-socket contact with the spherical zone 203 of the arm.

The roller segments 206 possess, furthermore, a radially outer toroidal face 208 (relative to the axis of the arm), by means of which the roller segments are each in rolling contact, respectively, with six tracks 1 formed longitudinally on the radially inner face of an annular wall 211 of a barrel 3 having an of axis Z and fixed to the axle stub 77. In the example illustrated, the barrel 3 is produced in the form of a "bowl", in that the annular wall 211 is connected at one of its ends to a bottom 8 to which the axle stub 77 is fastened, for example welded.

In this example of a joint, the roller segments 206 roll along the tracks 1 of the barrel 3 during telescopic movements of the shaft 204 in relation to the axle stub 77 or when each arm 202 moves in relation to the two corresponding tracks 1 during each revolution of the joint as a result of the presence of an angle between the axes T of the shaft 204 and Z of the axle stub 77 (mode of operation at an angle is according to a situation not shown).

The top of FIG. 16 shows the rollers 206 in the end position around the associated tripod arm 202.

Figure 1:
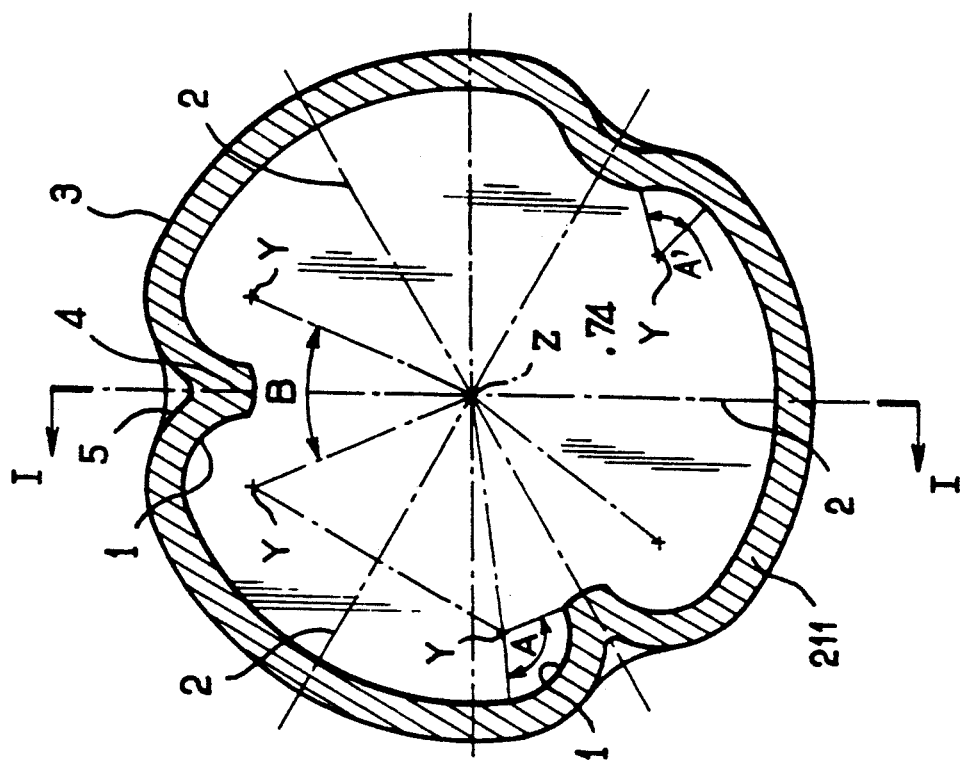
FIG. 1 is a view of a barrel according to the invention in longitudinal section along the axial plane I—I of FIG. 2.
Figure 2:
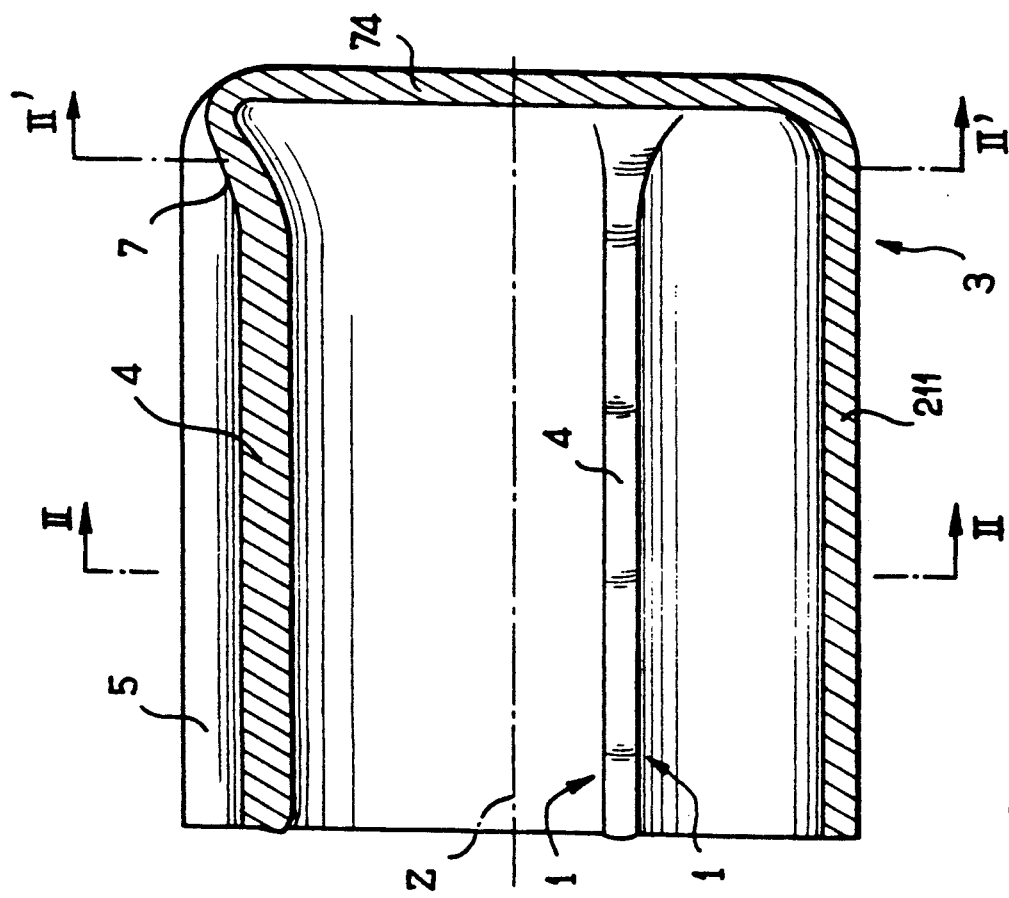
FIG. 2 is a cross-section through the barrel, the left-hand part along the plane II—II of FIG. 1 and the right-hand part along the plane II'—II' of FIG. 1.

FIG. 1 and the left-hand part of FIG. 2 show a barrel 3 which can be used to produce the joint described by way of example with reference to FIGS. 15 and 16 and to produce other joints described, for example, in FR-A-2,607,883, 2,622,653 and 2,525,306.

The inner profile of the annular wall 211 of the barrel 3 comprises six tracks 1 of axes Y parallel to the axis Z of the barrel and therefore extending longitudinally on the inner face of the annular wall 211. These tracks 1, which are rolling tracks in the example shown in FIGS. 15 and 16, but which could be sliding tracks for joints in which the interposed members are blocks instead of being roller segments, are obtained in geometrical terms by the movement parallel to the axis Y of generatrices in the form of sectors of a circle or substantially in the form of sectors of a circle extending in a plane perpendicular to the axis Y. Each track 1 is inscribed within an angle A, the value of which can be 90° to 120°, and they are arranged two by two and mutually opposed. Each mutually opposed pair is arranged symmetrically on either side of a half-plane 2 originating from the axis Z of the barrel 3. The half-planes 2 are offset at 120° relative to one another. The six tracks have the same radius, and their axes Y are located at the same distance from the axis Z and at the same distance from the respective half-plane 2.

Each track 1 extends, in particular, on one flank of an inner ridge 4 formed by an internal fold of the wall 211 of the barrel. The ridges 4 are directed axially and are arranged at 120° relative to one another about the axis Z. Each ridge 4 separates two tracks 1 which belong to two different pairs and which each extend on one of the flanks of the ridge.

The barrel 4 has a longitudinal groove or valley 5 on its outer surface in line with each of the ridges 4. The center angle B between the axes Y of two tracks 1 located on either side of a ridge 4 varies between 30° and 60°, depending on the type of joint for which the barrel is intended, on the shaping tool used and on the malleability of the component steel.

In line with each ridge 4, the radial thickness of the annular wall 211 is increased as a result of an incipient radial flow of the metal during shaping. This particular feature represents an effective reinforcement of this zone subjected to the torque transfer load from the interposed members, such as the blocks 206, and ensures the value of the aperture angle A and the correct orientation of the tracks 1.

The barrel 3 is obtained from a blank 11 (FIG. 12) having the form of a bowl with a flat bottom 8 and with a cylindrical lateral wall 9. This blank is obtained according to known industrial processes by deep drawing from annealed sheet steel. The thickness of the material of this blank is, for example, on the order of 4 to 5 mm for a motor vehicle of medium size.

As shown in FIG. 13, the bowl blank 11 can also have a rim 10 widened outwards substantially radially, making it possible to produce a barrel with a rim 6 oriented radially outwards, as shown in FIG. 5. This rim reinforces the barrel 3 near its orifice and may be desirable for the convenience of fastening a bellows (not shown) for protecting the homokinetic joint.

On the contrary, FIG. 6 shows the barrel as obtained from the blank of FIG. 12 without a rim.

As also shown in FIG. 5 (although this is true of the embodiment of FIG. 6), at the end of the annular wall 211 adjacent to the bottom 74 of the bowl the initial circular profile of the annular wall 211 has been left substantially unchanged. Moreover, starting from this end, the annular wall 211 has a transitional region 7 comprising successive transitional profiles corresponding to movements of material, the extent of which increases from the end to the region of constant profile occupying most of the axial length of the lateral wall 211.

Thus, as shown in the lower right-hand part of FIG. 2 corresponding to a section through the transitional region 7, the angle A' within which the tracks 1 are inscribed in the transitional region 7 decreases progressively towards the bottom 74 of the barrel.

For barrels having a rim 6 (FIG. 5), there is a second transitional zone 108 for connection to the rim 6. In a way not shown, the angle within which the tracks 1 are inscribed is progressively cancelled along the transitional zone 108 in the direction of the rim 6.

These transitional zones 7 and 108 involved in the shaping are relatively short and do not reduce the effective stroke of the relevant sliding joints. The barrels according to the invention are therefore highly suitable as main components for sliding universal joints.

In the example of FIGS. 5 and 7, the barrel is welded at its bottom 74 to a flange 75 equipped with fastening holes 76, for example making it possible to fasten the barrel to a motor-vehicle gearbox output. The holes 76 are in the extension of the valleys 5.

In the example of FIGS. 6 and 8, a wheel axle stub 77 is welded to the bottom of the barrel which is cut out to allow centering means 78 of the stub 77 to pass through.

Figure 3:
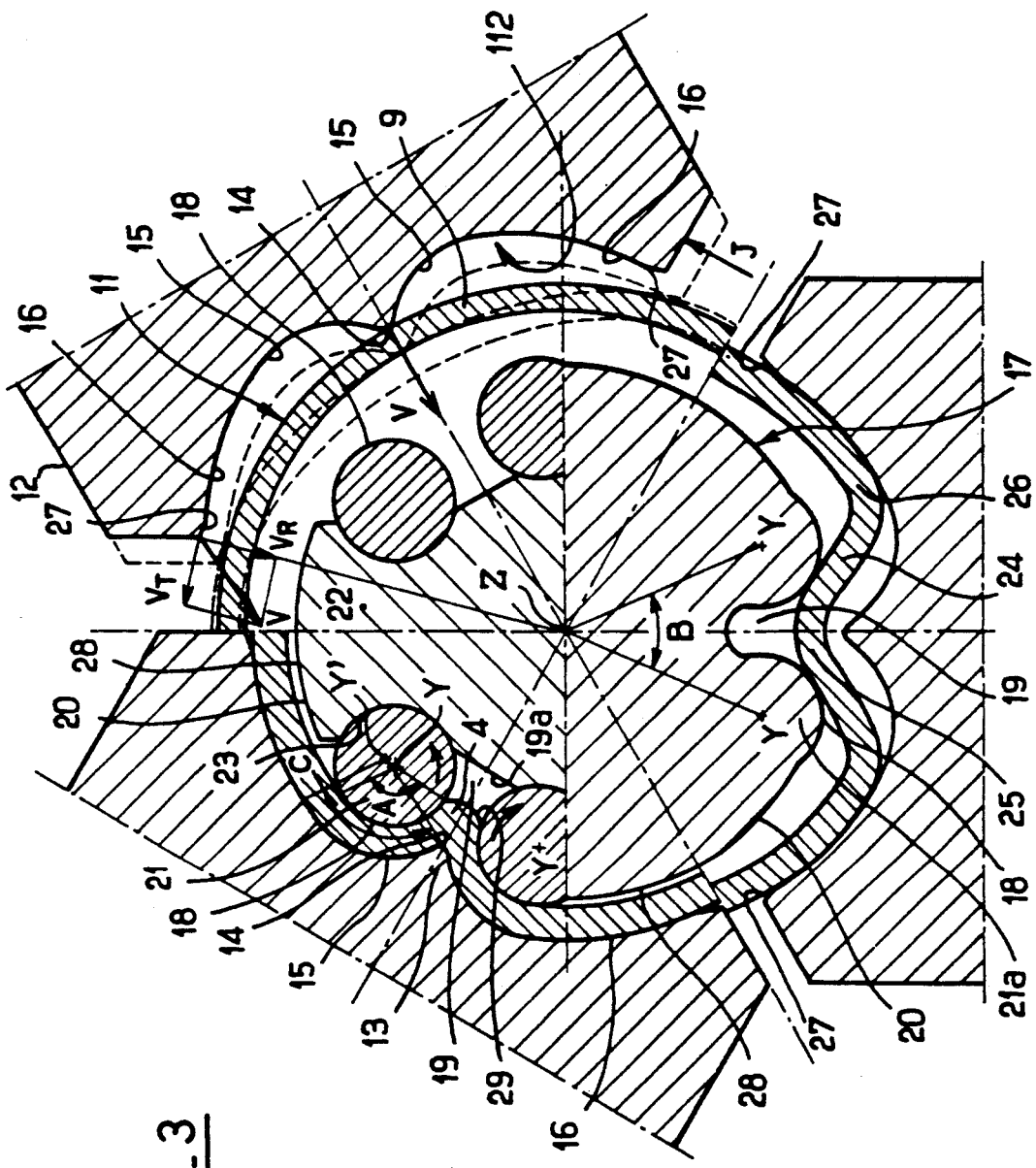
FIG. 3 is a cross-section through the barrel during the shaping by means of an integral shaping mandrel at the bottom of the Figure and of a composite shaping mandrel at the top of the Figure, the three dies being respectively in the initial, intermediate and final shaping phases.

FIG. 3 illustrates various steps in the process of shaping the tracks 1 on the inner face of the lateral wall 9 of the blank 11.

This process employs a tool comprising three dies 12 distributed about a mandrel 17 having an axis which is called Z, because it coincides with the axis Z of the bowl during the shaping.

After appropriate annealing, the bowl blank 11 is introduced around the mandrel 17 and between the three dies 12, which are sufficiently radially apart to leave sufficient annular space for the lateral wall 9 of the blank; see step a) at the top right of FIG. 3.

The dies 12 each possess, facing the mandrel 17, that is to say facing the lateral wall 9 of the blank 11 when this is in place, a pressure surface, designated as a whole by 112, which is substantially complementary with the outer profile of the lateral wall 211 of the barrel to be formed. In particular, the pressure surface 112 of each die 12 has a projection 13 the peak 14 of which extends parallel to the axis Z and is rounded. The projection 13 is contained between two arcs of a circle 15 having a profile corresponding substantially, with the exception of the wall thickness of the blank, to that of the tracks 1 to be produced. However, the circular regions 15 are inscribed within an angle C which is slightly smaller than the angle A within which the tracks 1 will be inscribed, as shown at the top left of FIG. 3. Furthermore, it is preferable that the axis Y' of the regions 15 be further away from the ridge 4 to be produced than the axis Y of the track 1 to be produced (as shown exaggerated in FIG. 3), so that the material of the blank is strongly compressed between the surface 15 and the mandrel in the vicinity of the ridge 4 where the metal experiences the greatest deformation.

At its end opposite the projection 13, each region 15 is connected to a concave circular profile 16 which will be centered on the axis Z of the mandrel and of the barrel at the end of the shaping of the barrel. Each circular profile 16 is followed, on the side opposite the arc of a circle 15, by an end region 27 of convex curvature, or rounded.

The inner shaping mandrel 17 has an outer profile which, in general terms, is substantially complementary with that of the inner face of the annular wall 211 of the barrel to be produced. In particular, the mandrel has six convex longitudinal protuberances 21 or 21a, the outer surface 18 of which is a shaping surface of substantially circular cross-section. Each of the shaping surfaces 18 is intended for forming one of the tracks of the barrel, and its axis coincides with the axis Y of the track 1 to be formed. In line with each ridge 4 to be formed, the circular protuberances 21 or 21a are separated by a longitudinal clearance 19 allowing full freedom for the shaping of the ridge.

The adjacent protuberances 21 or 21a not separated by a clearance 19 are joined in pairs by circumferential arcs 20 centered on the axis Z and having a radius slightly smaller than that which the corresponding region of the inner face of the barrel will possess, so as to have a slight play 28 relative to this region at the end of shaping. Thus, the shaping force is concentrated on the surfaces of the tracks 1 which require the highest accuracy and the best surface state.

In the embodiment illustrated in the lower half of FIG. 3, the mandrel 17 is integral and incorporates the protuberances 21a in one piece.

In the embodiment illustrated in the upper part of FIG. 3, the mandrel is of a composite type, in that the protuberances 21 consist of six cylindrical rollers resting on concave cylindrical bearing surfaces 23 of complementary curvature belonging to a core 22 carrying the connecting surfaces 20.

This composite mandrel technique allows an easier maintenance of the polish of the shaping surfaces 18 during intensive production and, if appropriate, a reconditioning involving only little outlay by the replacement of the rollers 21. Moreover, the freedom of rotation of these rollers on their bearing surface 23 makes it easier for the metal to flow during the formation of the ridges 4 under the thrust of the projections 13 of the dies 12, especially when the thickness of the ridges 4 (measured in the circumferential direction) is small in relation to the thickness of the sheet metal of the blank. After each shaping of a barrel, a lubricant can be injected between the rollers 21 and the bearing surfaces 23 via suitable ducts (not shown) provided in the core 22, so as to assist the rotation of the rollers during the shaping of the next barrel.

At the start of the process, the projections 13 of the dies are radially opposite the clearances 19 of the mandrel 17, and the dies 12 have between them a circumferential play designated by J in FIG. 3. According to the present invention, the annular wall 211 of the barrel is shaped by displacing the dies 12 simultaneously towards the axis Z.

In the plane of FIG. 3, this movement corresponds to a displacement of the projection 13 at a speed V without any tangential component. In contrast, the other shaping surfaces 15, 16, 17 extending at an equal circumferential distance on either side of the peak 14 have the same speed V as the peak 14, but, since their angular position about the axis Z is different, this speed V, for example as regards the chamfer 27 at the top right of FIG. 3, breaks down into a radial component VR and a tangential component VT. The tangential component VT brings about a progressive reduction of the circumferential play J between the dies.

The dashes in the upper right-hand part of FIG. 3 represent the position of the dies 12 at the start of shaping. At this stage, the ends 27 of the dies come into contact with the wall 9 of the bowl 11, whilst the three peaks 14 have already given the bowl an intermediate shape between a circle and a triangle. At the intermediate shaping stage shown at the bottom of FIG. 3, the dies 12 have come even closer to the axis Z in comparison with the situation represented by the dashes at the top right of the Figure. The profile of the lateral wall 9 of the blank is compressed circumferentially on itself, and a fold 24, the peak 25 of which has been initiated as a result of the radial thrust of the projection 13 of the dies 12, becomes more pronounced and comes spontaneously up against the cylindrical shaping surfaces 18 of the mandrel 17, while the oppositely directed folds 26 located on either side of each projection 13 roll towards the adjacent projection 13.

Because of the progressive reabsorption of the circumferential play J between the dies 12, the ends 27 of the dies 12 slide on the outer surface of the lateral wall 9 of the blank. Since the ends 27 are chamfered, this does not result in any damage to the wall of the blank.

The upper left-hand part of FIG. 3 shows the situation at the end of travel of the dies 12 towards the axis Z. The circumferential play J between the dies 12 has disappeared completely. The projections 13 have forced the material of the blank to flow between the adjacent shaping surfaces 18 with a very high pressure thereagainst. There remains a slight spacing 28 between the connecting arcs 20 of the mandrel and the corresponding inner face of the lateral wall 211 of the barrel, and because of this the pressing force imparted by the dies 12 is concentrated over the entire angle A within which the tracks 1 are inscribed. The peak 29 of the ridge 4 obtained as a result of the folding 25 and then of the flow between the surfaces 18 has not reached the bottom 19a of the clearance 19.

Figure 4:
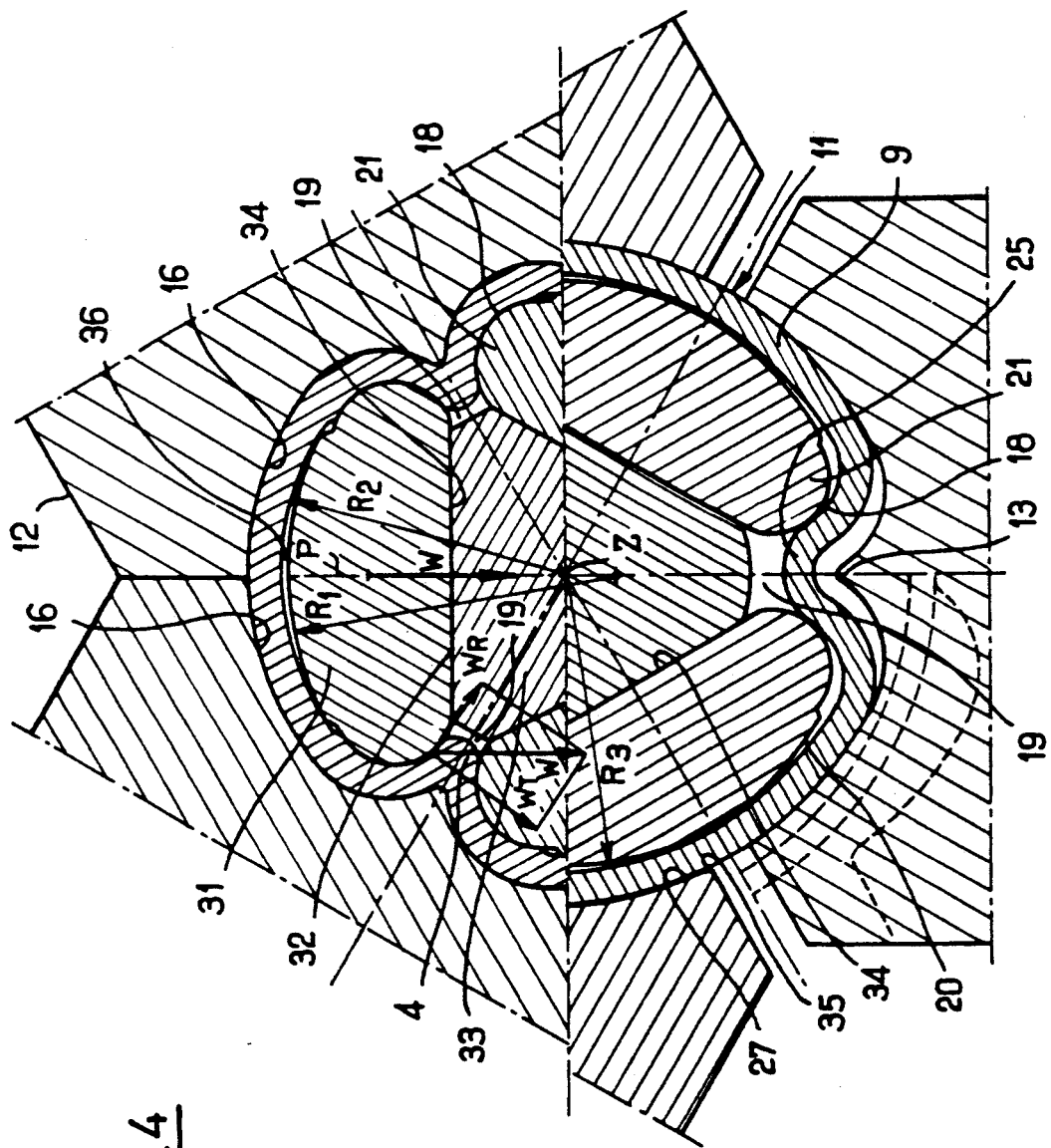
FIG. 4 is a cross-sectional view of the dies of a contractible mandrel in the intermediate shaping phase at the bottom of the Figure and in the final shaping phase at the top of the Figure.

FIG. 4 illustrates another embodiment of the process according to the invention.

The dies 12 are similar to those of FIG. 3 and therefore will not be described in detail. In contrast, the mandrel 17 is modified to make it easier to shape the ridges 4, the radial height of which governs the amount by which the tracks envelop the interposed members (roller segments 206 of FIGS. 15 and 16) or, in other words, the value of the angle A.

For this purpose, the inner shaping mandrel comprises three shaping elements 31 contractible radially, that is to say movable towards the axis Z, during the shaping. To this effect, the shaping elements 31 each comprise a plane oblique rear face 34 bearing slidably against the lateral faces 32 of a core 33 in the form of a pyramid with an equilateral triangular base. The movement of the shaping elements 31 towards the axis Z during shaping occurs as a result of a relative axial movement between the core 33 and the shaping elements 31.

Each shaping element 31 carries two protuberances 21 defining the substantially cylindrical shaping surfaces 18 for two mutually opposite tracks 1. The two shaping surfaces 18 are joined by a connecting surface 20. The projections 13 of the dies 12 are located opposite the clearances 19 which are formed between the successive shaping elements 31, and the ridges 4 of the barrel will be shaped in these clearances 19.

Dashes at the bottom of FIG. 4 represent the situation before the start of movement of the dies 12. The shaping elements 31 are then in the position represented by unbroken lines at the bottom of FIG. 4, in which the clearances 19 have a relatively large circumferential dimension.

Starting from the position represented by dashes, the dies 12 are displaced as described with reference to FIG. 3, that is to say at a speed which does not have any tangential component for the projections 13. At this stage, the shaping elements 31 are kept stationary (with the exception of a purely axial movement which will be described later). The dies 12 push back the wall of the blank which comes to bear strongly with its inner surface on the connecting surface 20 of each shaping element 31.

In the tool illustrated in FIG. 4, the ends 27 of the dies do not have the reversed curvature described with reference to FIG. 3, but alternatively the radius of curvature R1 of the connecting surfaces 20 of the shaping elements 31 is larger than the final inner radius of the corresponding regions of the barrel (radius R2 at the top of FIG. 4), in order to reduce the pressure on the ends 27 of the dies 12 and thus prevent the end edges 35 of the dies from damaging the outer surface of the barrel as a result of the relative circumferential movement between these edges 35 and the wall of the barrel. However, the radius R1 is smaller than or substantially equal to the inner radius R3 of the lateral wall of the blank, in order, during the intermediate shaping phase (at the bottom of FIG. 4), to allow the above-described mutual bearing between the blank and the connecting surfaces 20 of the elements 31.

In the intermediate shaping phase (bottom of FIG. 4) when the shaping elements 31 have not yet begun to move towards the axis Z, the fold 25 of the lateral wall 9 of the blank 11 has formed in the clearance 19 more easily than in the embodiment according to FIG. 3 because the clearance 19 has a larger circumferential dimension.

In the rest of the process, the dies 12 continue their movement towards the axis Z, but this movement is accompanied by a movement of the shaping elements 31 likewise towards the axis Z as a result of a relative axial movement of the core 33 in the appropriate direction. The movement of the shaping elements 31, as seen in a plane perpendicular to the axis Z (the plane of FIG. 4), has a speed W which has no tangential component in the axial mid-plane P of each element 31. The speed of the other points of each shaping element 31 is the same speed W as in the plane P. However, at a distance from the plane P, especially along the shaping surfaces 18, as shown at the top left of FIG. 4, the speed W breaks down into a radial speed WR and a tangential speed WT. The presence of this tangential component causes the circumferential dimension of the clearances 19 to decrease. In other words, the shaping surfaces 18, after allowing the fold 25 to form between them, subsequently grip the fold 25 between them, whilst the projections 13 of the dies 12 prevent the material from escaping radially outwards, so as more effectively to form ridges 4 which can have a particularly small circumferential thickness.

Between the regions carrying the tracks 1, which are therefore in contact with the shaping surfaces 18, during the final shaping phase the wall of the blank has undergone a circumferential or tangential compression which has laid it against the pressure surface 16 of the dies 12 as a result of an arching effect. A play 36 therefore occurs between the inner wall of the barrel and the connecting surfaces 20 of the shaping elements 31.

As in FIG. 3, at the simultaneous end of the movement of the dies 12 and the movement of the shaping elements 31, the top 29 of each ridge 4 is set apart from the bottom of the corresponding clearance 19.

Figure 11:
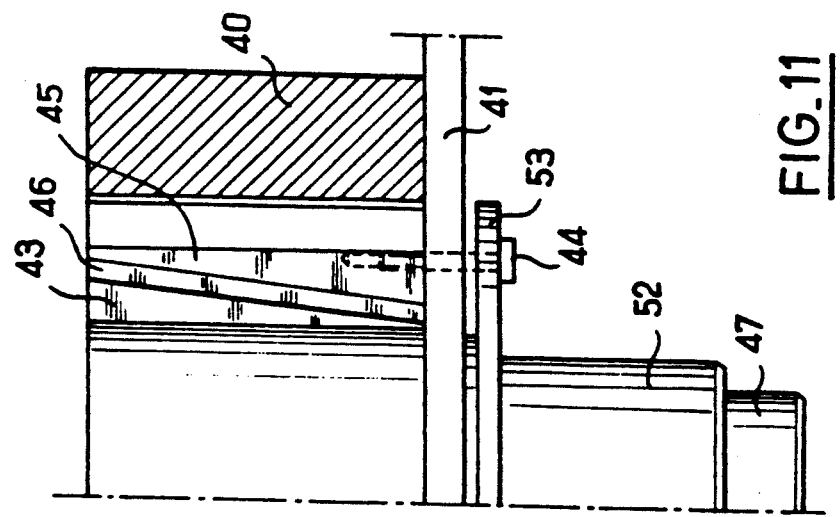
FIG. 11 is a half-view showing the binding ring 40 in axial section and a counter-slideway 43 in side elevation.
Figure 10:
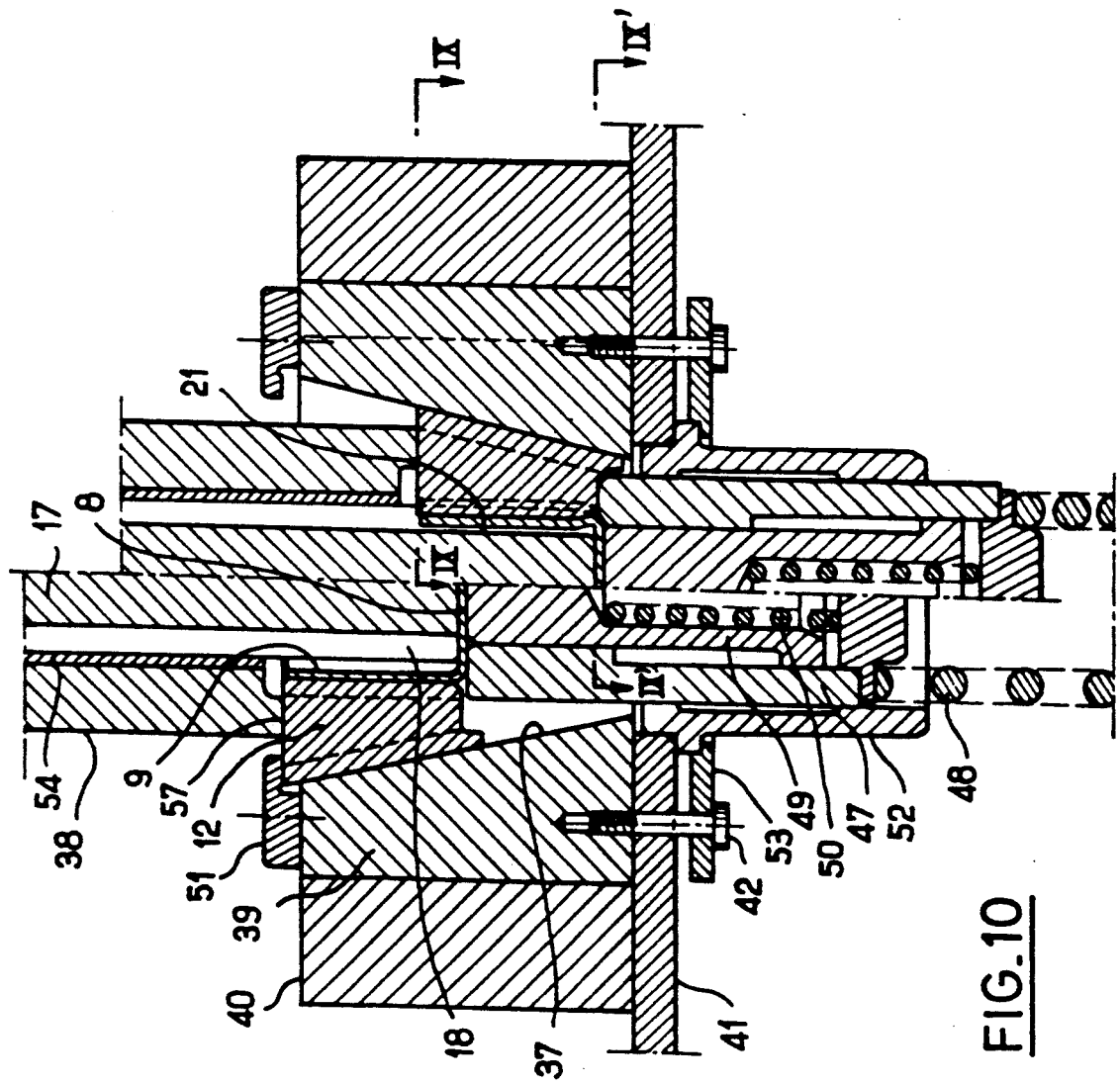
FIG. 10 is an axial section through the press tool with a mandrel of fixed configuration along the line X—X of FIG. 9, the tool being in the initial shaping phase in the left-hand part of the Figure and in the final shaping phase in the right-hand part of the Figure.

FIGS. 9 to 11 illustrate diagrammatically the press tool according to the invention allowing the economical industrial shaping of barrels from the deep-drawn blanks of FIGS. 12 and 13 by means of the inner mandrel 17 of invariable configuration of FIG. 3.

Each die 12 has a rear face directed radially outwards which is oblique relative to the axis Z and which bears on one of three stationary complementary inclined slideways 37 which for the dies 12 define sliding directions converging downwards towards the axis Z. A tubular pusher 38 fastened to the piston (not shown) of a press bears on the upper side of the three dies 12. The effect of the descent of the press piston is to move the three dies 12 jointly downwards on the slideways 37, thereby bringing the dies radially closer to the axis Z from their initial position (left-hand part of FIGS. 9 and 10 corresponding to the upper right-hand part of FIG. 3) to the end-of-shaping position (right-hand part of FIGS. 9 and 10 corresponding to the upper left-hand part of FIG. 3).

The slideways 37 are machined on segments 39 which are retained externally by a binding ring 40 and which are fastened to a platen 41 of the press by means of screws 42. The function of the binding ring 40 is particularly to withstand the reaction forces directed radially outwards which occur as a result of the force exerted radially inwards on the blank by the dies 12.

Three counter-slideways 43 (FIGS. 9 and 11) are held on the press platen 41 by means of screws 44 are each interposed circumferentially between two successive segments 39. Each counter-slideway 43 possesses, towards each of the segments 39 to which it is adjacent, a face 45 parallel to the axial plane of symmetry of this segment, in order to block the segments circumferentially by bearing on a corresponding face 39a of the segments.

The raising of the dies 12 at the end of the shaping operation is carried out by means of a tubular plunger 47 subject to the action of a spring 48 or any other equivalent means, such as a pneumatic or hydraulic jack. The plunger 47 acts simultaneously on the lower face of the dies 12 and on the bottom 8 of the barrel which has just been formed. The plunger contains an ejector 49, itself moved upwards in relation to the plunger 49 by a spring 50 so as to lift the finished barrel out of the dies when these, having concluded their rising travel, come up against a stop ring 51 fastened to the upper face of the segments 39. The plunger 47 slides in a tubular guide 52 fastened to the press platen by means of a flange 53 and the screws 42 (FIG. 10) and 44 (FIG. 11).

When the dies are up against the stop ring 51, they are set radially apart from the finished barrel as a result of the slope of the slideways 37. The press piston continues to rise, driving with it the pusher 38, which moves away from the dies 12, and the mandrel 17 to which it is likewise fixed. The ejector 49 raises, together with the mandrel 17, the finished barrel, which caps the free lower end of the mandrel 17. A stripping bush 54 which is interposed in an annular space between the inner mandrel 17 and the tubular pusher 38 comes to bear on the free annular edge of the finished barrel when, at the end of the return stroke of the piston, the finished barrel has come free of the dies 12. The stripping bush 54 then slides downwards in relation to the pusher 38 and the mandrel 17 in order to free the barrel from the mandrel 17. The stripping bush 54 can be actuated by coming up against a fixed point of the press cylinder at a particular stage of the rising stroke of the press piston or by a jack according to a known technique.

The operation takes place as follows: the deep-drawn blank, suitably annealed and lubricated, is placed on the upper face of the ejector 49 which at this stage is substantially flush with the upper face of the dies.

The descent of the press piston (not shown), to which the mandrel 17 and the pusher 38 are fixed, is subsequently brought about. The mandrel 17 projecting downwards relative to the pusher 38 pushes back the bottom 8 of the blank and the ejector 49 as far as the position shown in the left-hand half of FIG. 10, at the same time compressing the spring 50 correspondingly. From this moment, the pusher 38 bears on the upper driving surfaces 57 of the dies 12 which descend along the inclined slideways 37, thereby coming radially closer to the axis Z and circumferentially closer to one another. The mandrel 17 and consequently the blank experience an axial movement together with the dies 12.

The shaping proceeds until the end of the working stroke shown in the right-hand part of FIGS. 9 and 10. Subsequently, the press piston rises, driving the mandrel 17 and the pusher 38 upwards. When the barrel has been formed, the dies are pushed upwards by the plunger 47, and the barrel is then freed from the dies 12 by the ejector 49 and from the mandrel 17 by the stripper 54.

The tool illustrated in FIG. 14, which will be described only in respect of its differences from that of FIG. 10, is designed for using a radially contractible mandrel according to FIG. 4, the initial shaping phase being shown on the left of FIG. 14 and the final shaping phase on the right of the Figure.

The shaping elements 31 are held axially on the pusher 38 by a ring 57 which forms an inner collar and which is itself fastened to the pusher 38 by means of an elastic hoop 58. The shaping elements 31 receive this ring in an indentation in the form of a sector of a circle 59 and thus preserve their freedom of movement in the radial direction in relation to the pusher 38. Elastic clips 60 or 61 produced from a helical spring of annular axis and seated in indentations 71 and 72 of each of the three shaping elements 31 press the elements 31 against the oblique faces 32 of the pyramidal core 33. The indentation 72 is made in the lower face of the shaping elements 31 which is adjacent to the inner face of the bottom 8 of the blank during operation. The indentation 71 is formed axially beyond an end of the shaping surfaces of the elements 31, opposite the bottom 8 during operation.

The pyramidal core 33 carries an axial shaft 62 on its base facing upwards, possessing, at a distance above the elements 31, a widening 63 which receives a transverse axle 64 passing through axial slots 81 of the bush 54, and elongate apertures 65 machined axially in the wall of the tubular pusher 38. The widening 63 also receives, above the transverse axle 64, the end 66 on the a rod of Z axis of a hydraulic or pneumatic jack (not shown) and, under the axle 64, the base of a compression spring 68 which opposes this jack and the other end of which bears on the top of the shaping elements 31. The spring 68 surrounds the shaft 62 and is surrounded by the pusher 38.

Furthermore, here, the ring 51 limiting the upward return travel of the dies 12 serves as a stop for the transverse axle 64 and therefore for the pyramidal core 33, starting from the intermediate shaping phase represented by unbroken lines at the bottom of FIG. 4.

The operating mode is as follows. At the outset, as in the preceding example, the upper surface of the ejector 49 is level with the upper surface of the dies 12, and the pusher 38 and the mandrel 17 are raised sufficiently to allow the blank 11 to be put in place.

Subsequently, the pusher 38 is lowered and drives the shaping elements 31 via the ring 57, and the jack for actuating the rod 66 is activated, thereby placing the axle 64 at the lower end of the aperture 65, compressing the spring 68 and putting the shaping elements 31 in the position radially set apart, the assembly as a whole being as shown in the left-hand part of FIG. 14 at the moment when the pusher 38 comes to bear on the top of the dies 12. From this position, the pusher 38 pushes the dies 12 downwards, the ejector 49 continues its downward travel and the plunger 47 begins its downward stroke.

In a first part of the working stroke as far as the position represented by unbroken lines at the bottom of FIG. 4, the axle 64 remains laid against the lower ends of the apertures 65 by the actuating jack for the rod 66. During this time, the dies 12 begin to come radially closer to the axis Z.

At a particular stage in the working stroke, the axle 64 encounters the stop ring 51, thus interrupting the downward travel of the pyramidal core 33. The tubular pusher 38 continues its working stroke, driving the shaping elements 31 by means of the ring 57. The shaping elements 31 therefore execute in relation to the pyramidal core 33 a sliding movement which is converted, relative to the blank and to the dies, into a movement directed towards the axis Z without any axial component. This movement towards the axis Z is greatly assisted by the radial thrust of the dies 12 which is transmitted by the lateral wall of the blank, this taking place until the profile of the upper part of FIG. 4 is obtained.

Figure 14:
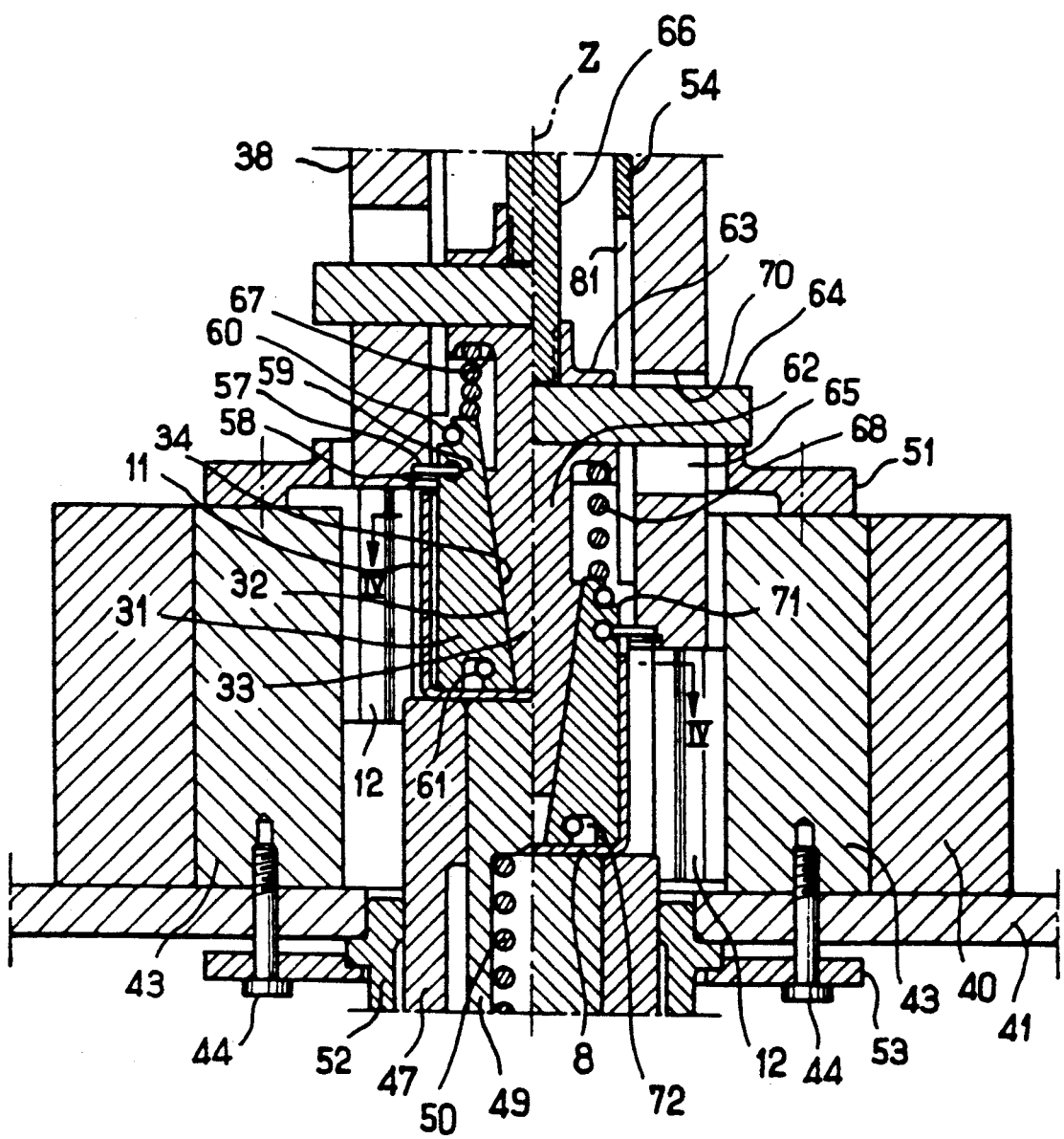
FIG. 14 is a view similar to that of FIG. 10, but relating to a second embodiment of the tool corresponding to the mandrel of FIG. 4.

The final shaping phase is also illustrated in the right-hand part of FIG. 14. The axial stroke of the pusher 38 after the axle 64 has encountered the stop ring 51 is such that, in the final shaping phase (right-hand part of FIG. 14), there remains a slight play between the axle 64 and the upper end 70 of the apertures 65.

The ejection of the part and its stripping are carried out in the same way as in the arrangement illustrated in FIG. 10, except that the control of the rising of the press piston cancels the pressure to the auxiliary jack actuating the rod 66 and thus allows the opposing spring 68 to lift the pyramidal core 33 until the transverse axle 64 comes up against the upper end 70 of the apertures 65, thereby relieving the radial pressure of the contractible mandrel within the barrel formed and making the stripping easier. In fact, the previous retraction of the dies 12 and, in particular, of their projections 13, allowed a slight elastic relaxation of the ridges 4 radially outwards (by a few tenths of a millimeter) and consequently a relaxation of the grip exerted on the ridges 4 by the elements 31, despite the fact that the elements 31 come slightly closer to one another circumferentially when the axle 64 changes from the position shown on the right of FIG. 4 to the position up against the end 70 of the apertures 65.

In the example of FIG. 10, as in that of FIG. 14, the working force necessary for shaping the barrels is at a maximum at the end of travel. Consequently, mechanical knuckle-joint or crank presses are especially advantageous, as well as hydraulic presses with two working speeds.

The shaping of barrels with six tracks which are the most common has been described in detail, but it is clear that the shaping process and the simple high-performance press tool could easily be used for shaping a barrel having a different number of tracks.

I claim:

1. A process for making a barrel for a sliding universal transmission joint, comprising:
   providing a barrel blank having a substantially cylindrical lateral wall with an inner face, a shaping mandrel having a plurality of shaping surfaces capable of shaping said inner face of said lateral wall of said barrel blank to define a plurality of tracks having a substantially circular profile extending parallel to the axis of said barrel blank, with each said track extending on one side of a ridge separating said track from another said track on the other side of said ridge, said ridge having a greater radial thickness than the radial thickness of said barrel blank and a plurality of dies disposed circumferentially about said shaping mandrel, said dies having a circumferential play between each other and pressure surfaces thereon directed toward said shaping mandrel;

placing said substantially cylindrical lateral wall of said barrel blank between said shaping surfaces of said shaping mandrel and said dies; and shaping said inner face of said lateral wall by simultaneously displacing said dies toward a central axis of said shaping mandrel and compressing said lateral wall of said barrel against said shaping surfaces with said pressure surfaces thereof until said inner face of said lateral wall of said barrel blank defines a plurality of tracks having a substantially circular profile extending parallel to the axis of said barrel blank, with each said track extending on one side of a ridge separating said track from another said track on the other side of said ridge, said ridge having a greater radial thickness than the radial thickness of said barrel blank.

2. The process of claim 1, wherein, before said dies are displaced, said lateral wall of said barrel blank has a circumferential length substantially equal to the developed circumferential length desired for said lateral wall after shaping.

3. The process of claim 1, wherein said pressure surfaces of said dies comprise regions complementary to but offset in relation to said shaping surfaces of said mandrel in order to compress said lateral wall of said blank to a greater extent in regions of greater desired deformation or provide greater accuracy when shaping said inner face of said lateral wall.

4. The process of claim 1, wherein said pressure surfaces of said dies comprise convex regions which, during said step of shaping, form longitudinal valleys on the outside of said lateral wall and said ridge on the inside of said lateral wall corresponding to said longitudinal valleys.

5. The process of claim 4, and further comprising connecting a flange to said barrel, said flange having a plurality of fastening holes therein positioned opposite said longitudinal valleys.

6. The process of claim 1, wherein said barrel blank has a radial wall connected to one end of said substantially cylindrical lateral wall, said lateral wall being shaped during said step of shaping to provide a transitional profile at said one end corresponding to the movement of the material of said lateral wall during said step of shaping between said tracks and said ridges and said radial wall.

7. The process of claim 1, wherein said step of shaping comprises moving said dies in the direction of the central axis while said dies are displaced toward the central axis, said barrel blank and said shaping mandrel moving axially with said dies.

8. The process of claim 1, wherein said shaping mandrel comprises a plurality of circumferentially spaced shaping elements, each said shaping element having a respective said shaping surface thereon, and said shaping elements moving closer to the central axis of said shaping mandrel during the displacement of said dies toward the central axis.

9. The process of claim 8, wherein said shaping elements move closer to the central axis after an initial amount of displacement of said dies toward the central axis.

10. The process of claim 8, wherein said shaping mandrel has a pyramidal central core with inclined faces and said shaping elements have inclined rear faces bearing on respective said inclined faces of said pyramidal central core, the movement of said shaping elements toward the central axis being caused by relative axial movement of said pyramidal central core.

11. The process of claim 1, wherein said shaping mandrel comprises a core having a plurality of rotatably mounted shaping elements, each said shaping element having a respective said shaping surface thereon, and during displacement of said dies toward the central axis, said shaping elements are allowed to rotate about an axis corresponding to the axis of the track being produced and relative to said core of said shaping mandrel.

12. The process of claim 1, wherein:
said shaping mandrel comprises sets of two protuberances having said shaping surfaces thereon with a clearance therebetween for shaping a pair of said tracks with a said ridge therebetween;
said pressure surfaces of said dies comprise projections; and
said projections, during said step of shaping, cause the material of said barrel blank to flow radially inwards into said clearance to define said ridges.

13. The process of claim 12, wherein said dies, during said step of shaping, circumferentially compress said lateral wall of said barrel blank and form a fold which, at least virtually spontaneously, engages with said clearance in order to increase the amount of material of said lateral wall of said barrel blank in said clearance for forming a said ridge by the flow of the material.

14. The process of claim 12, wherein each said die circumferentially extends about said shaping mandrel, each said projection being disposed on a respective said die midway along the circumferential extent thereof.

15. The process of claim 12, wherein said dies are displaced toward the central axis of said shaping mandrel such that the speed of said projections in a direction tangential thereto is substantially zero.

16. The process of claim 12, wherein said clearances between said protuberances each have a bottom and said step of shaping comprises interrupting the displacement of said dies before a peak of said ridge formed on said inner face of said lateral wall of said barrel blank touches said bottom of the corresponding said clearance of said shaping mandrel.

17. The process of claim 12, wherein said pressure surfaces of each said die comprise a region on either side of said projection having a profile corresponding substantially to said substantially circular profile of said tracks to be produced, with the exception of the wall thickness of said barrel blank.

18. The process of claim 17, wherein said dies each have rounded edge regions outside of said regions on either side of said projection.

19. The process of claim 12, wherein said pressure surfaces of each said die comprise a region on either side of said projection having a profile corresponding substantially to said substantially circular profile of said tracks to be produced on said inner face of said lateral wall of said barrel blank, said regions being offset relative to said two protuberances of said shaping mandrel, and thus said tracks to be produced, to reduce the thickness of the material of said lateral wall in the vicinity of each said ridge to be produced.

20. The process of claim 12, wherein said shaping mandrel is composite, having a core rotatably supporting a plurality of cylindrical shaping elements, said cylindrical shaping elements comprising said protuberances having said shaping surfaces thereon and being rotatable about their axes.

21. The process of claim 12, wherein said step of shaping comprises, while said dies are displaced toward the central axis, pivoting movement of said shaping surfaces of each set of two said protuberances towards said clearance therebetween about the axes of said tracks being produced.

22. The process of claim 21, wherein said pivoting movement of said shaping surfaces of said protuberances is caused by friction between the material of said lateral wall of said barrel blank moving into said clearance and said shaping surfaces.

23. The process of claim 12, wherein said shaping mandrel further comprises a plurality of substantially cylindrical convex surfaces circumferentially alternating with said clearance between said shaping surfaces.

24. The process of claim 23, wherein said convex surfaces of said shaping mandrel have a radius larger than the radius of said inner face of said lateral wall of said barrel opposite said convex surfaces after said displacement of said dies has stopped.

25. The process of claim 23, wherein, after said displacement of said dies has stopped, a gap remains between said convex surfaces and said inner face of said lateral walls of said barrel opposite said convex surface.

26. The process of claim 25, wherein said shaping mandrel comprises shaping elements, each said shaping element having two said shaping surfaces thereon with a said convex surface therebetween, and said convex surfaces of said shaping elements have a radius smaller than the radius of said inner face of said lateral wall of said barrel blank before shaping and larger than the radius of said inner face of said lateral wall of said barrel opposite said convex surfaces after said displacement of said dies has stopped.

27. The process of claim 1, wherein said barrel blank is a deep-drawn sheet-metal blank in the form of a bowl having a flat bottom at least partially closing one of the ends of said lateral wall.

28. The process of claim 27, wherein said barrel blank has a radially outwardly directed rim at the other end thereof.

29. A press tool for forming a barrel for a sliding universal transmission joint, comprising:
a mandrel having a central axis for connection to a press piston for movement parallel to the central axis of said mandrel, said mandrel having on its periphery cylindrical shaping surfaces having axes parallel to the central axis capable of shaping the inner face of a lateral wall of a barrel blank to define a plurality of tracks having a substantially circular profile extending parallel to the axis of the barrel blank, with each track extending on one side of a ridge separating the track from another track on the other side of the ridge and said ridge having a greater radial thickness than the radial thickness of the barrel blank;
a plurality of dies circumferentially spaced about said shaping mandrel with a circumferential gap between them, said dies being mounted on respective slideways converging towards the central axis of the mandrel; and
a pusher for connection to the press piston in order to simultaneously compel said dies to slide along said slideways in directions converging towards the central axis of said mandrel.

30. The press tool according to claim 29, and further comprising a stripping bush interposed radially between said mandrel and said pusher, said stripping bush having a tubular configuration.

31. The press tool according to claim 30, and further comprising means for returning said dies in the direction corresponding to a movement of said dies away from the central axis of said mandrel.

32. The press tool according to claim 29, wherein said mandrel comprises a pyramidal core having a plurality of faces, a plurality of shaping elements having said shaping surfaces thereon being mounted slidably against respective said faces, and wherein said tool possesses stop means limiting the axial movement of said core and drive means carried by said pusher for driving said shaping elements relative to said core in the direction brining said shaping elements closer to said axis of said mandrel when said core is up against said stop means.

33. The tool according to claim 29, wherein said mandrel comprises a core and a plurality of cylindrical shaping elements having said shaping surfaces thereon rotatably supported by said core for rotation about their axes in complementary cylindrical receptacles of said core.

* * * * *